(12) United States Patent
Chandrasekhar et al.

(10) Patent No.: US 9,471,126 B2
(45) Date of Patent: *Oct. 18, 2016

(54) POWER MANAGEMENT FOR PCIE SWITCHES AND DEVICES IN A MULTI-ROOT INPUT-OUTPUT VIRTUALIZATION BLADE CHASSIS

(71) Applicant: Dell Products L.P., Round Rock, TX (US)

(72) Inventors: Babu Chandrasekhar, Round Rock, TX (US); John Loffink, Austin, TX (US); Michael Brundridge, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/861,832

(22) Filed: Sep. 22, 2015

(65) Prior Publication Data

US 2016/0011641 A1    Jan. 14, 2016

Related U.S. Application Data

(63) Continuation of application No. 13/589,334, filed on Aug. 20, 2012, now Pat. No. 9,170,627.

(51) Int. Cl.
| | | |
|---|---|---|
| *G06F 1/26* | (2006.01) | |
| *G06F 1/28* | (2006.01) | |
| *G06F 1/32* | (2006.01) | |

(52) U.S. Cl.
CPC .............. *G06F 1/3203* (2013.01); *G06F 1/26* (2013.01); *G06F 1/266* (2013.01); *G06F 1/28* (2013.01)

(58) Field of Classification Search
None
See application file for complete search history.

(56) References Cited

U.S. PATENT DOCUMENTS

| 7,370,029 B2 | 5/2008 | Ito et al. |
| 7,398,401 B2 | 7/2008 | Goud et al. |
| 7,725,632 B2 | 5/2010 | Baba et al. |
| 8,627,118 B2 | 1/2014 | Nolterieke et al. |
| 9,170,627 B2 * | 10/2015 | Chandrasekhar ......... G06F 1/26 |

(Continued)

*Primary Examiner* — Tanh Nguyen
(74) *Attorney, Agent, or Firm* — Jackson Walker L.L.P.

(57) ABSTRACT

A method for managing the power of a chassis includes receiving a plurality of modular information handling systems into the chassis, receiving a plurality of information handling resources into the chassis, virtualizing access of one of the modular information handling resources to two or more of the plurality of modular information handling systems, the modular information handling systems sharing the modular information handling resource, and, upon initialization of one of the information handling systems, determining power requirements of the shared information handling resource, receiving power requirements from the information handling systems, determining whether the power requirements from the information handling system includes power requirements of the shared information handling resource, subtracting the power requirements of the shared information handling resource from the power requirements of the information handling system to determine resultant power requirements, comparing the resultant power requirements with available power, and allowing operation of the information handling system.

21 Claims, 6 Drawing Sheets

(56) References Cited

U.S. PATENT DOCUMENTS

| | | |
|---|---|---|
| 2004/0030774 A1 | 2/2004 | Espinoza-Ibarra et al. |
| 2006/0026447 A1 | 2/2006 | Naveh et al. |
| 2006/0112286 A1 | 5/2006 | Whalley et al. |
| 2007/0055914 A1 | 3/2007 | Chandwani et al. |
| 2007/0118771 A1 | 5/2007 | Bolan et al. |
| 2007/0260896 A1 | 11/2007 | Brundridge et al. |
| 2007/0260897 A1 | 11/2007 | Cochran et al. |
| 2008/0052437 A1 | 2/2008 | Loffink et al. |
| 2008/0077817 A1 | 3/2008 | Brundridge et al. |
| 2008/0163234 A1 | 7/2008 | Stronge et al. |
| 2009/0193276 A1 | 7/2009 | Shetty et al. |
| 2010/0115314 A1 | 5/2010 | Sultenfuss |
| 2011/0010706 A1 | 1/2011 | Lambert et al. |
| 2012/0185718 A1 | 7/2012 | Miyoshi |
| 2013/0226362 A1 | 8/2013 | Jagadishprasad et al. |
| 2013/0268779 A1 | 10/2013 | Hueston et al. |
| 2014/0006676 A1 | 1/2014 | Chandrasekhar et al. |
| 2014/0052309 A1 | 2/2014 | Chandrasekhar et al. |
| 2014/0059370 A1 | 2/2014 | Loffink et al. |
| 2014/0164657 A1 | 6/2014 | Chandrasekhar et al. |
| 2014/0173072 A1 | 6/2014 | Chandrasekhar et al. |
| 2016/0011641 A1* | 1/2016 | Chandrasekhar .......... G06F 1/26 713/320 |

* cited by examiner

POWER MANAGEMENT FOR PCIE SWITCHES AND DEVICES IN A MULTI-ROOT INPUT-OUTPUT VIRTUALIZATION BLADE CHASSIS

The present patent application is a continuation of a previously filed patent application, U.S. patent application Ser. No. 13/589,334, filed Aug. 20, 2012, the entirety of which is hereby incorporated by reference.

TECHNICAL FIELD

The present disclosure relates in general to information handling systems, and more particularly to power management for PCIe switches and devices in a multi-root input-output virtualization blade chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Existing server architectures either provide a single monolithic server capable of running one operating system and input/output ("I/O") resources at a time, or bulky blade server chassis providing multiple servers and I/O control modules in a single chassis. A system chassis with multiple information handling systems with various peripheral and input/output capabilities common to the chassis as a whole may provide advantages, as it allows a blade server chassis in a small form factor, thereby providing a blade server chassis with a size comparable to the size of a monolithic server. Implementation of a system chassis with multiple information handling systems with various peripheral and input/output capabilities common to the chassis as a whole presents numerous challenges.

SUMMARY

In accordance with the teachings of the present disclosure, the disadvantages and problems associated with removal of information handling resources in a shared input/output infrastructure have been reduced or eliminated.

In accordance with some embodiments of the present disclosure, a system includes a chassis configured to receive a plurality of modular information handling systems and a plurality of information handling resources, one or more switches configured to virtualize access of one of the modular information handling resources to two or more of the plurality of modular information handling systems, and one or more chassis management controllers housed in the chassis. Each information handling resource is received through a slot in the chassis. The modular information handling systems shares the modular information handling resource. The one or more chassis management controllers are configured, upon initialization of one of the information handling systems, to determine power requirements of the shared information handling resource, to receive power requirements from the information handling systems, to determine whether the power requirements from the information handling system includes power requirements of the shared information handling resource, subtract the power requirements of the shared information handling resource from the power requirements of the information handling system to determine resultant power requirements, compare the resultant power requirements with available power, and, based on the comparison, allow operation of the information handling system.

In accordance with other embodiments of the present disclosure, a method for managing the power of a chassis includes receiving a plurality of modular information handling systems into the chassis, receiving a plurality of information handling resources into the chassis, virtualizing access of one of the modular information handling resources to two or more of the plurality of modular information handling systems, the modular information handling systems sharing the modular information handling resource, and, upon initialization of one of the information handling systems, determining power requirements of the shared information handling resource, receiving power requirements from the information handling systems, determining whether the power requirements from the information handling system includes power requirements of the shared information handling resource, subtracting the power requirements of the shared information handling resource from the power requirements of the information handling system to determine resultant power requirements, comparing the resultant power requirements with available power, and, based on the comparison, allowing operation of the information handling system.

In accordance with yet other embodiments of the present disclosure, an article of manufacture includes a computer readable medium and computer-executable instructions carried on the computer readable medium. The instructions are readable by a processor. The instructions, when read and executed, cause the processor to determine a plurality of modular information handling systems received into a chassis, determine a plurality of information handling resources received into the chassis, virtualize access of one of the modular information handling resources to two or more of the plurality of modular information handling systems, and, upon initialization of one of the information handling systems, determine power requirements of the shared information handling resource, receive power requirements from the information handling systems, determine whether the power requirements from the information handling system includes power requirements of the shared information handling resource, and, subtract the power requirements of the shared information handling resource from the power requirements of the information handling system to determine resultant power requirements, compare the resultant power requirements with available power, and, based on the comparison, allow operation of the information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
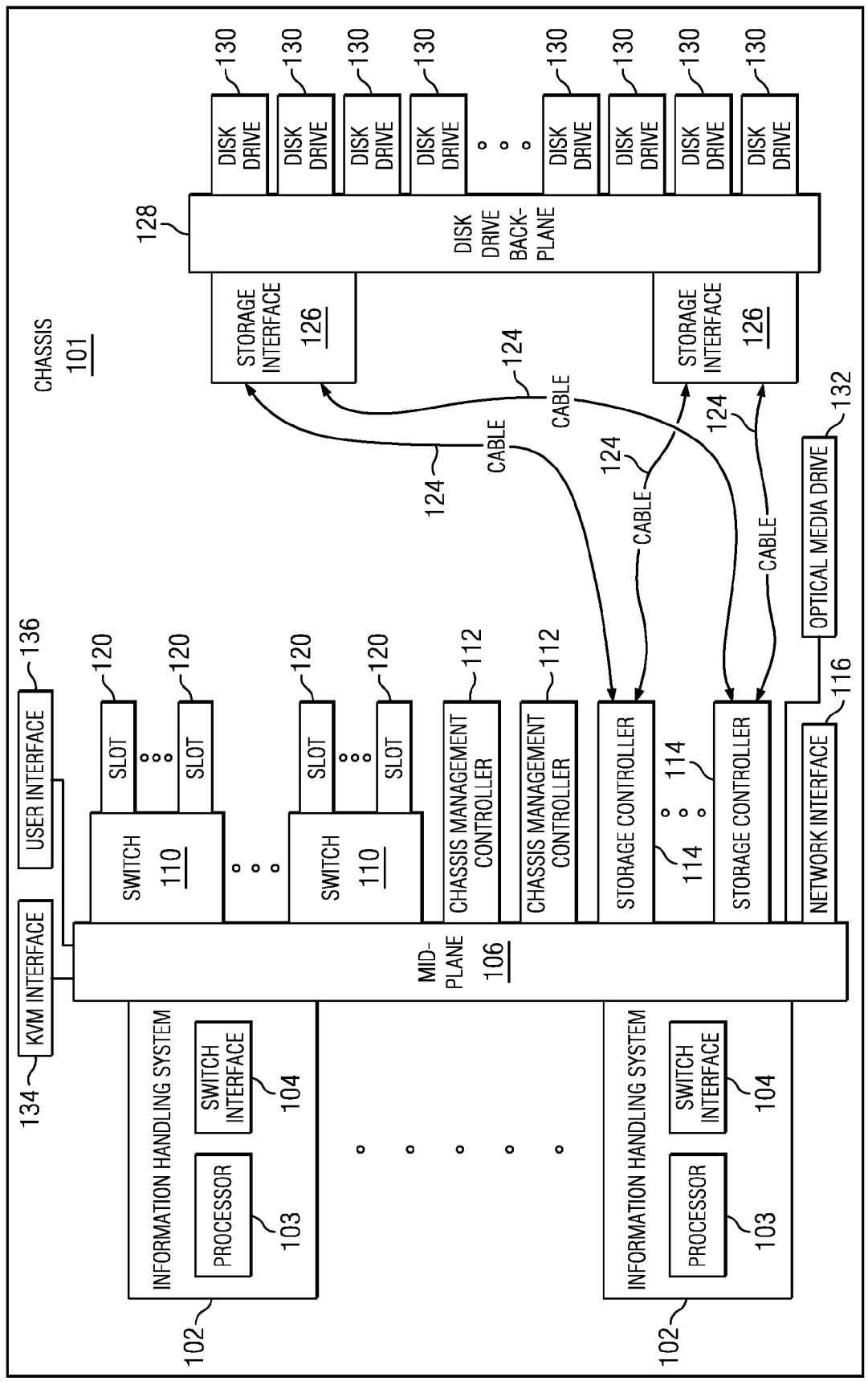
FIG. 1 illustrates a block diagram of an example system chassis with multiple information handling systems and with various peripheral and input/output capabilities common to the chassis as a whole, in accordance with certain embodiments of the present disclosure.

Preferred embodiments and their advantages are best understood by reference to FIGS. 1-6, wherein like numbers are used to indicate like and corresponding parts.

For the purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components or the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and input/output capabilities common to chassis 101 as a whole, in accordance with certain embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

A given information handling system 102 may generally be operable to receive data from and/or communicate data to one or more disk drives 130 and/or other information handling resources of chassis 101 via mid-plane 106. In certain embodiments, a given information handling system 102 may be a server. In such embodiments, an information handling system may comprise a blade server having modular physical design. In these and other embodiments, a given information handling system 102 may comprise an M class server. As depicted in FIG. 1, a given information handling system 102 may include a processor 103 and one or more switch interfaces 104 communicatively coupled to processor 103.

A processor 103 may include any system, device, or apparatus configured to interpret and/or execute program instructions and/or process data, and may include, without limitation a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a hard drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces for redundancy, high availability, and/or other reasons.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Also as shown in FIG. 1, system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Intelligent Platform Management Interface ("IPMI") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or parameters associated with operation of system 100 and its various information handling resources (e.g., power usage, processor allocation, memory allocation, security privileges, etc.). Although FIG. 1 depicts chassis as having two chassis management controllers 112, chassis 101 may include any suitable number chassis management controllers 112.

A storage controller 114 may and include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), input/output routing, and error detection and recovery. As shown in FIG. 1, a storage controller 114 may coupled to a connector on mid-plane 106. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically coupled such expansion cards to a switch 110.

Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low-profile to mid-plane 106, a switch 110, or another components, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or other suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with greater number (e.g., 25) disk drives 130. Thus, a storage interface 126 may provide a switching mechanism and/or disk drive addressing mechanism that allows an individual information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling information handling resources (e.g., Peripheral Component Interconnect Express ("PCIe") adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at time. Chassis management controller 112 may be configured to handle routing and switching through switches 110 to affect sharing or a resource to multiple information handling systems 102 or to affect dedicated assignment of a resource to a single information handling system 102.

Figure 2:
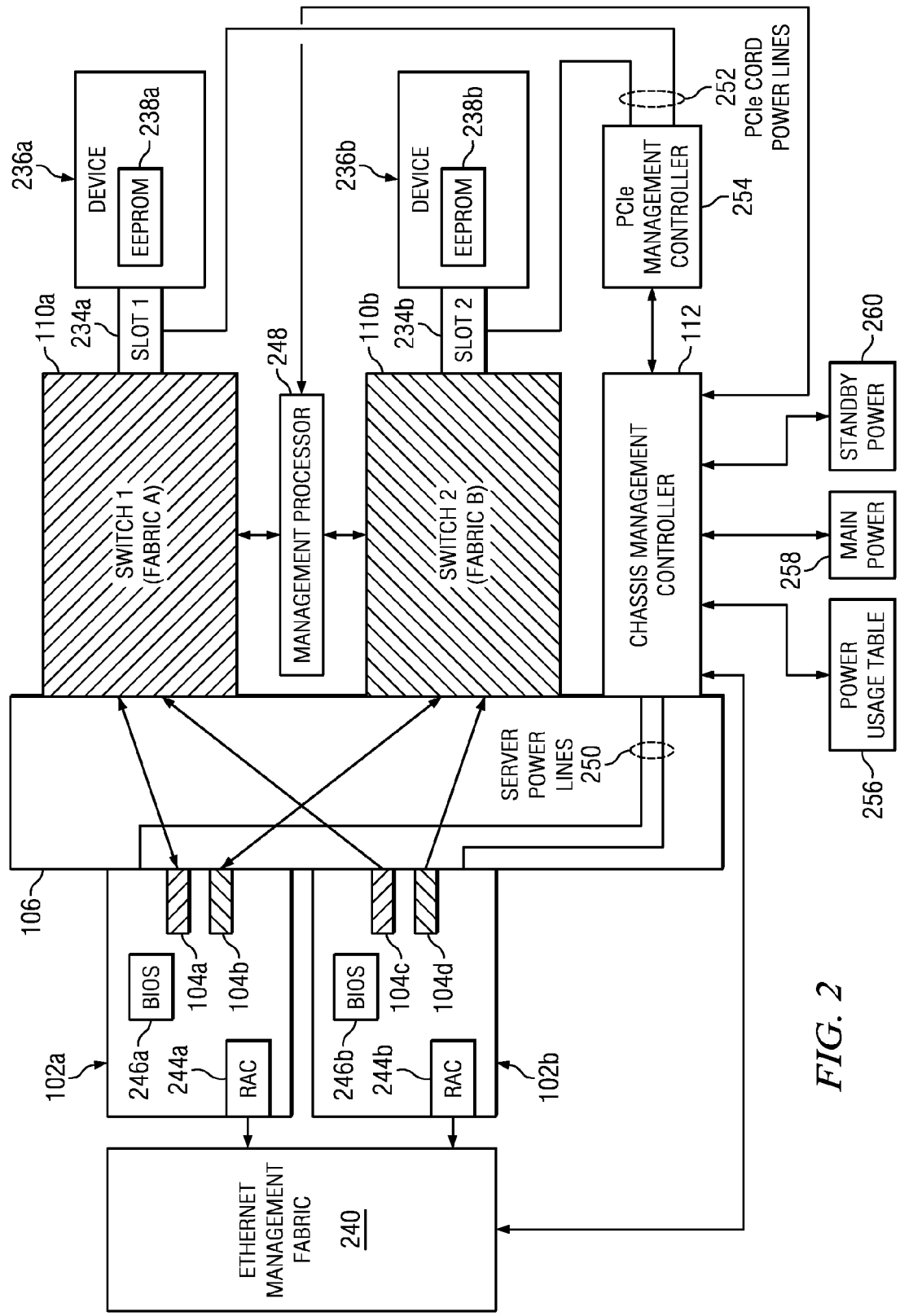
FIG. 2 illustrates a more detailed block diagram of example system configured to provide power management in a modular chassis for PCIe switches and devices in a multi-root input-output virtualization ("IOV") environment for multiple information handling systems in accordance with certain embodiments of the present disclosure.

FIG. 2 illustrates a more detailed block diagram of example system 100 configured to provide power management in the modular chassis 101 for PCIe switches and devices in a multi-root input-output virtualization ("IOV") environment for multiple information handling systems in accordance with certain embodiments of the present disclosure.

Chassis 101 may include a management processor 248 communicatively coupled to one or more of chassis management controller 112 and switches 110. Management processor 248 may be any system, device, or apparatus configured to facilitate management and/or control of switches 110. Management processor 248 may be configured to issue commands and/or other signals to switches 110. Management processor 248 may comprise a microprocessor, microcontroller, DSP, ASIC, EEPROM, or any combination thereof. In one embodiment, management processor 248 may run a Linux operating system and include application-programming-interfaces ("APIs") for supporting configuration of IOV in system 100 for sharing devices connected to slots of chassis 101 to multiple information handling systems 102. The APIs of management processor 248 may provide the interface to chassis management controller 112 for configuring IOV. Management processor 248 may be configured to manage both switches 110. In one embodiment, management processor 248 may be communicatively coupled to a Ethernet management fabric 240 and to information handling systems 102. In another embodiment, chassis management controller 112 may be communicatively coupled to the information handling systems 102 through Ethernet management fabric 240. Chassis management controller 112 may be directly communicatively coupled to the Ethernet management fabric 240 or through, for example, management processor 248. In one embodiment, the hardware or functionality of management processor 248 may be incorporated into chassis management controller 112. In such an embodiment, the functionality may be implemented as software in the form of a software service. Chassis 101 may include any suitable number of management processors 248. In one embodiment, chassis 101 may include a management processor implemented in similar fashion to management processor 248 for every switch in chassis 101.

Chassis 101 may include multiple information handling systems 102. Chassis 101 may include any suitable number of information handling systems 102. In one embodiment, information handling systems 102 may be referred to as "blades".

Each information handling system 102 may include cards 104, as described in association with FIG. 1. Information handling systems 102 may include a basic input-output system 246 ("BIOS") which may be implemented, for example, on firmware for execution by the information handling system. Each information handling system 102 may access BIOS upon, for example, start-up of an information handling system 102 to initialize interoperation with the rest of chassis 101.

Each information handling system 102 may include a remote access controller 244. Remote access controller 244 may be implemented by, for example, a microprocessor, microcontroller, DSP, ASIC, EEPROM, or any combination thereof. Remote access controller 244 may be configured to communicate with on or more of chassis management controller 112 and management processor 248. Such communication may be made, for example, through Ethernet management fabric 240. Remote access controller 244 may be configured to provide out-of-band management facilities for management of the information handling system 102. Such management may be made by elements of chassis 101 even if the information handling system 102 is powered off or powered to a standby state. Remote access controller 244 may include a processor, memory, and network connection separate from the rest of the information handling system 102. Remote access controller 244 may be communicatively coupled to BIOS 246.

Switches 110 may contain PCIe cards instead of the typical blade Ethernet, Fibre Channel or InfiniBand cards. Interfaces 104 of the information handling systems 102 may attach to switches 110 through the cards of switches 110. Switches 110 may connect information handling systems 102 to slots 234. Slots 234 may include one or more of the slots 120 of FIG. 1 in any suitable combination.

In one embodiment, each of information handling systems 102 may be communicatively coupled to each of switches 110 through one of interfaces 104 resident on the information handling system 102. For example, information handling system 102a may be communicatively coupled to switch 110a through interface 104a and to switch 110b through interface 104b. Information handling system 102b may be communicatively coupled to switch 110a through interface 104c and to switch 110b through interface 104d. Thus, each of switches 110 may provide its switching fabric to each of information handling systems 102 in order to route the given information handling system 102 to respective slots 234 associated with the switch 110.

Slots 234 may be configured to connect to associated devices 236, though fewer devices may be present than the associated capacity of chassis 101. Chassis 101 may include any suitable number of slots 234. In one embodiment, devices 236 may include PCIe-based cards or devices. Each such device 236 may represent an information handling resource to be selectively, for example, shared among multiple information handling system 102 or dedicated to a single information handling system 102. Device 236 may comprise, for example, a RAID controller, network card, or other information handling resource. Furthermore, device 236 may include a specific shared component such as a network interface card ("NIC") 238. Devices 236 may include management information or circuitry configured to provide information to chassis 101 regarding the operation or specification of device 236. For example, device 236 may include EEPROM 238 containing such information.

In order to support IOV, the driver and firmware of device 236 may include support for single root IOV. To maintain routes between given information handling systems 102 and slots 234, switches 110 may include virtual hierarchies from slots 234 to information handling systems 102. Particular functions, such as virtual functions or shared functions, for single root IOV for a given device 236 may be mapped in switch 110, providing behavior similar to multiple-root IOV. In one embodiment, wherein device 236 contains multiple information handling resources such as a NIC and USB interface, a function may be provided for each such information handling resource. Thus, from the perspective of information handling systems 102 the multiple such information handling resources may appear to be separate and unrelated. A given slot 234 or device 236 which has been virtualized may be accessed by two or more virtual functions, which allow the sharing of the resource. Physical functions, as opposed to the above-described virtual functions or shared functions, may be mapped or stored in management processor 248. A physical function representing an information handling resource may be provided to a single information handling system 102. In cases where a device 236 contains multiple information handling resources, individual physical functions may be provided for each such resource. Multiple instances of a virtual function may be provided to multiple information handling systems 102. If, for example, multiple information handling systems 102 are sharing a device 236, then access to device 236 may be divided into multiple virtual NICs using virtual functions, each of which are mapped by switches 110 to the respective information handling system 102. Furthermore, specific APIs for accessing a given device 236 may be mapped or stored in management processor 248. Chassis management controller 112 may be configured to access these physical functions or APIs in management processor 248.

Because information handling resources, such as those in devices 236 coupled to slots 234, are not located within an information handling system 102, but rather in a shared chassis using switches 110 to virtualize and route input/output communications among selected information handling systems 102, powering of such information handling resources may not be directly controlled by an associated information handling system 102. Consequently, powering of information handling resources such as devices 236 and information handling systems 102 in chassis 101 may be conducted by chassis management controller 112.

Chassis management controller 112 may be configured to route, switch, control, or otherwise direct other components of chassis 101 to route, switch, or control power to slots 234 for use by devices 236 and to information handling systems 102. Power may be routed to information handling systems 102 through server power lines 250. Power may be routed to slots 234 through PCIe card power lines 252. In one embodiment, each information handling system 102 may be coupled using a dedicated power line. In another embodiment, each slot 234 may be coupled using a dedicated power line. In yet another embodiment, each information handling system 102 may be coupled to power through a power line routed through the switch fabrics of chassis 101, such as through switches 110. In still yet another embodiment, each slot 234 may be coupled to power through a power line routed through the switch fabrics of chassis 101, such as through switches 110.

The source of power to which information handling system 102 or slot 234 may be coupled may include any power source of chassis 101, such as main power 258 and standby power 260. Chassis management controller 112 may be configured to determine, based upon the operational state of information handling system 102 or slot 234, whether to couple information handling system 102 or slot 234 to main power 258, standby power 260, or to no power at all.

Chassis 101 may include a PCIe management controller 254 configured to control the configuration and operation of slots 234 and devices 236 connected thereto. PCIe management controller 254 may be implemented by, for example, a microprocessor, microcontroller, DSP, ASIC, FPGA, EEPROM, or any combination thereof. PCIe management controller 254 may be configured to interface slots 234 and may include circuitry for powering each of slots 234 through PCIe card power lines 252. PCIe management controller 254 may be communicatively coupled to chassis management controller 112.

Chassis management controller 112 may be configured to manage and determine power usage of components, such as those shown or not shown in FIGS. 1 and 2, of chassis 101. Chassis management controller 112 may be configured to determine maximum power capabilities of chassis 101 and, based on the capabilities and demands, selectively provide power to the components of chassis 101. Further, chassis management controller 112 may be configured to provide power to devices 236 as needed for use by information handling systems 102 because information handling systems 102 are unable to directly control the power themselves.

Power usage information determined by chassis management controller 112 may be stored power usage table 256. Furthermore, information about specified power usage of various components of chassis 101 may be stored in power usage table 256 for access by chassis management controller 112. Table 256 may be implemented by one or more data structures, records, files, database, or other suitable entities.

In operation, when chassis 101 is initially powered on, chassis management controller 112 may be powered on and direct the power-up operations of other components of chassis 101. Chassis management controller 112 may power on PCIe management controller 254. Directly or through the use of PCIe management controller 254, chassis management controller 112 may power on each slot 234 to determine whether any devices 236 are connected thereto. The presence of devices 236 within slots 234 may be enumerated and stored in power usage table 256. Thus, in one embodiment, chassis management controller 112 may power on devices 236 before powering on information handling systems 102.

During the enumeration process, chassis management controller 112 may determine the power requirements of device 236. The power requirements of device 236 may be gathered according to the nature of device 236. If device 236 is configured to be able to be shared using IOV on chassis 101, then chassis management controller 112 may determine the power requirements by accessing information on device 236 directly. If device 236 is not configured to be able to be shared using IOV on chassis 101, then chassis management controller 112 may rely upon interrogation of device 236 by an information handling system 102, looking up default values in a table such as power usage table 256, or user input.

After enumerating and identifying devices 236, devices 236 may be powered off. In one embodiment, devices 236 may be kept off until they are accessed or mapped by chassis 101 for use by an information handling system 102. Upon a later insertion or removal of a device 236, the enumeration may be updated. The power requirements associated with device 236 may be updated in power usage table 256.

In addition, chassis management controller 112 may identify the power requirements of various components of chassis 101—such as information handling systems 102, switches 110, management processor 248, PCIe management controller 254, and various elements of FIG. 1—to operate chassis 101 and store the results in power usage table 256. The power required by a component and whether the component is currently using the power may be stored. The total power available through, for example, main power 258 and standby power 260, may be determined and stored.

From the available power and the power presently required, chassis management controller 112 may construct an overall chassis budget in power usage table 256. As components of chassis 101 are requested, activated, or used, power consumption of the component may be evaluated against the overall chassis budget. Power consumption of the component may determined by, for example, reference to power usage table 256. If sufficient power exists for the component, use or activation of the component may be allowed and chassis management controller 112 may deduct the necessary power from the budget. If insufficient power exists within the budget for the component, and suitable action may be taken. For example, additional power may be activated from main power 258 or standby power 260, standby power 260 may be used in addition to main power, or power may be denied to the component.

During the operation of chassis 101, if a given device 236 is to be mapped to one or more information handling systems 102, the power usage of the device 236 as determined by chassis management controller 112 may be incorporated into the power budget. If power is available within the budget for the use of device 236, then device 236 may be powered on. Chassis management controller 112 may manage the power of device 236 for information handling systems 102 because, while device 236 may appear to a given information handling system 102 to be internal to the given information handling system 102, the power for device 236 does not come from the same power source as used by the given information handling system 102. Furthermore, device 236 may be shared by multiple information handling systems 102. As a consequence, a given information handling system 102 may not have sufficient information to determine actual power usage of device 236 and would overstate the power requirements—by making superfluous power requests for device 236 that has already been allocated—or understating the power requirements, by indicating power is not needed for device 236 when another information handling system 102 is still operating device 236. Further, a given information handling system 102 may not know when power can be turned off to device 236. Thus, chassis management controller 112 may manage the power operation of devices 236 for an individual information handling system 102 in chassis 101.

If the given device 236 is to be shared among multiple information handling systems 102, then the power associated with device 236 may be marked within the budget as shared power. Subsequently, when a given information handling system 102 is powered on and conducts its own power inventory, the power inventory from the perspective of the given information handling system 102 may include power needed for operation of device 236. The power inventory of information handling system 102 may determine that device 236 is to be used by the given information handling system 102 though, for example, initialization conducted by BIOS 246 and RAC 244. The power inventory including device 236 may be created because the given information handling system 102 may typically assume that its resources, such as device 236, are powered by the given information handling system 102 itself. However, within chassis 102, the given information handling system 102 may not have responsibility for directly powering device 236. Furthermore, the given information handling system 102 may be unaware that device 236 is to be shared with other information handling systems 102. Thus, power information from the given information handling system 102 with regards to device 236 may be inaccurate. Consequently, chassis management controller 112 may subtract the power requirements of device 236 from the power request from the given information handling system 102.

Similarly, if the given device 236 is not to be shared among multiple information handling systems 102, but the power requirements associated with device 236 are already known to chassis management controller 112, then the power requirements of the device 236 may be subtracted from the overall budget received from a given information handling system 102.

In one embodiment, one or more of devices 236 may be configured with the capability to be shared using IOV in conjunction with chassis 101. In such an embodiment, device 236 may include management information on EEPROM 238 regarding model information and/or specifications of device 236. Chassis management controller 112 may access EEPROM 258 to determine power information based on information contained therein.

In another embodiment, one or more of devices 236 may not be configured with the capability to be shared using IOV in conjunction with chassis 101. For such devices, power inventory of device 236 may be made through any suitable process, such as determining PCIe slot power limit. For such a device 236, BIOS 246 may query the device 236 for its power consumption and forward the information to RAC 244, which may forward the information as part of power inventory of a given information handling system 102 to chassis management controller 112. If the slot power limit cannot be determined because, for example, device 236 is unknown, then a default budget such as twenty-five watts may be assumed. An alert may be generated to a user of chassis 101 to set power for the card. In such a case, wherein chassis management controller 112 may not have already conducted the power inventory or budget of such a device 236, chassis management controller 112 may accept the power requirements for device 236 provided by the given information handling system 102.

Further, if the PCIe slot power limit to be determined for device 236 is unavailable, chassis management controller 236 may attempt to determine the power requirements for device 236. Such a case may arise, for example, upon boot-up before information handling systems 102 are powered on. Device 236 may include information on EEPROM 238 regarding model information and/or specifications of device 236. Chassis management controller 112 may access EEPROM 258 to determine power information based on information contained therein. Chassis management controller 112 may provide a default power requirement when the device 226 is unrecognized or unknown.

Default power requirements for a device 236 may be included within power usage table 256. The default power estimate may be based upon the size and type of slot 234.

If device 236 is non-shared, chassis management controller 112 may determine the power usage of device 236 through the methods described above, such as determining the power usage itself or through a given information handling system 102. If the power to be used by device 236 is determined—such as in cases where device 236 is not configured with the ability to be shared—using BIOS 246 and RAC 244 of the given information handling system 102 to which a non-shared device 236 is mapped, then the power inventory of device 236 may be available when device 236 is to be mapped to the given information handling system 102. The given information handling system 102 may pass this information to chassis management controller 112 as part of the power inventory for information handling system 102. In such cases, chassis management controller 112 may retain the power inventory of non-shared device 236 included within the overall inventory received from the given information handling system 102. In other cases, wherein the power required by device 236 is determined by chassis management controller 112 itself, the power inventory of non-shared deice 236 included within the overall inventory received from a given information handling system 102 may be discarded, and the inventory determined by chassis management controller 112 itself used instead.

Chassis management controller 112 may apply suitable voltage sources to various components of chassis 101, such as itself, information handling systems 102, and devices 236. In one embodiment, chassis management controller 112 may use standby power 260 to power itself. In another embodiment, chassis management controller 112 may use main power 258 to power information handling systems 102. Furthermore, chassis management controller 112 may use main power 258 to power information handling systems 102 when information handling systems 102 are in active or in standby mode. Information handling systems 102 may utilize a virtual standby power rail for use when in standby mode, but the actual power derived from chassis 101 may be provided by main power 258. In addition, support management circuitry such as RAC 244 may be powered by main power 258, rather than standby power 260. The support management circuitry such as RAC 244 may be powered by virtual standby power derived from main power 258.

Chassis management controller 112 may release the allocated power for device 236 from the overall power budget if, for example, device 236 is no longer shared or accessed by any information handling systems 102, the information handling systems 102 to which the device 236 is mapped are turned off or removed from chassis 101.

Chassis management controller 112 may ensure that devices 236 are always powered when an associated information handling system 102 is up and running in order to ensure proper discovery of devices 236 by information handling system 102. If a given information handling system 102 is powered from off to standby, chassis management controller 112 may power on device 236 before providing the specified power to information handling system 102. Such power to device 236 may include standby power 260, rather than main power 258. As discussed above, even though information handling system 102 may perceive that it has been powered with standby power, the standby aspect may be virtualized and power actually provided from main power 258.

If a given information handling system 102 is powered from standby to on, chassis management controller 112 may power on device 236 before providing the specified power to a given information handling system 102. Such power to device 236 may include main power 258, with standby power 260 already activated. The power to the given information handling system 102 may continue to be provided by main power 258.

If a given information handling system 102 is powered from on to standby, chassis management controller 112 may power down the given information handling system 102 to standby before powering down device 236 to standby power. Further, as described above, chassis management controller 112 may determine whether any other information handling systems 102 are using device 236 before powering down device 236 to standby. Such power to device 236 may include powering down device 236 from main power 258 to standby power 260. The power to the given information handling system 102 may continue to be from main power 358, but may appear to the given information handling system 102 to be from a virtualized standby power.

If a given information handling system 102 is powered from standby to off, chassis management controller 112 may power down the given information handling system 102 to off before powering down device 236 to off. Further, as described above, chassis management controller 112 may determine whether any other information handling systems 102 are using device 236 before powering down device 236 to off. Such power to device 236 may include powering down device 236 from standby power 260 to off. The power to the given information handling system 102 may be powered down from virtualized standby power—provided through main power 258—to off.

If chassis management controller 112 reboots—in cases such as a firmware update or a failover—chassis management controller 112 may enumerate the current power allocation by evaluating the presence and status of slots 234 and any connected devices 236.

Figure 3:
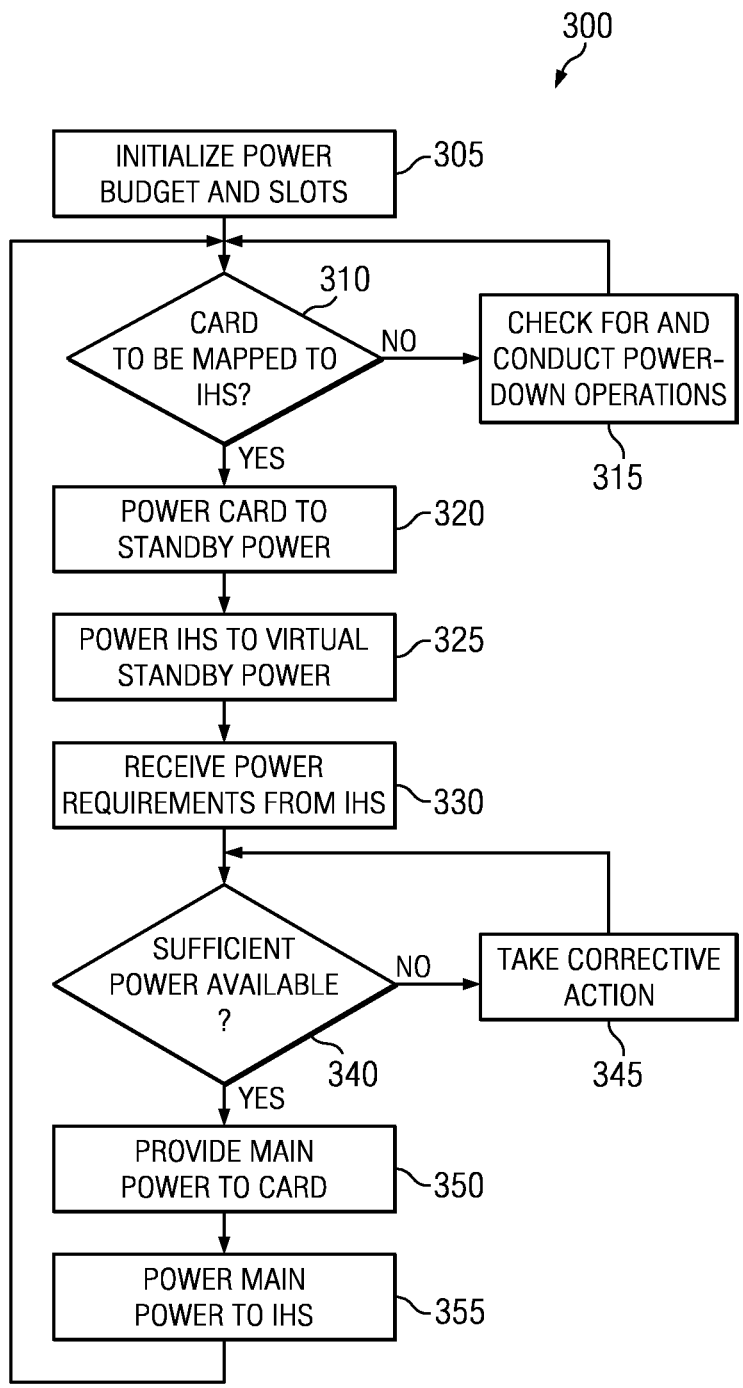
FIG. 3 illustrates a flow chart of an example method for power management for PCIe switches and devices in a multi-root input-output virtualization blade chassis.

FIG. 3 illustrates a flow chart of an example method 300 for power management for PCIe switches and devices in a multi-root input-output virtualization blade chassis. According to certain embodiments, method 300 may begin at step 305. As noted above, teachings of the present disclosure may be implemented in a variety of configurations of system 100 as shown in FIGS. 1 and 2. As such, the preferred initialization point for method 300 and the order of the steps comprising method 300 may depend on the implementation chosen.

Method 300 may begin in response to any suitable stimulus or trigger. For example, method 300 may be invoked in response to powering on of chassis 101. In another example, method 300 may be invoked after a failover or reboot of chassis management controller 11. In these and other embodiments, method 300 may be implemented as firmware, software, applications, functions, libraries, or other instructions continually monitoring chassis 101 for such powering on. In a further embodiment, method 300 may be implemented fully or partially by such instructions within chassis management controller 112.

In step 305, a power budget for chassis 101 and associated slots 234 may be determined. Such a budget may include the power available, such as through main power 258 and standby power 260, and the power requirements of the operation of various components of chassis 101. Furthermore, the contents and power requirements of slots 234, and any associated devices 236, may be determined. Step 305 may be implemented fully or in part by the steps of method 400 as shown in conjunction with FIG. 4.

In step 310, it may be determined whether a device 236 such as a card is to be mapped to an information handling system 102. Such a mapping may be conducted using the IOV configuration of chassis 101. If a device 236 is not to be mapped to an information handling system 102, then method 300 may proceed to step 315. If a device 236 is to be mapped to an information handling system 102, then method 300 may proceed to step 320.

In step 315, it may be determined whether any power-down or shut-down operations are to be conducted on components of chassis 101 such as information handling systems 102. The shutting down of an information handling system 102 may cause the shutting down of associated resources such as devices 236. However, because of the shared nature of devices 236 on chassis 101, information handling systems 102 may not handle the power management of devices 236 themselves. Step 315 may be implemented fully or in part by method 500 as shown in conjunction with FIG. 5.

In step 320, a device 236 such as a card which is to be mapped to an information handling system 102 may be powered on to standby power, if it is not already so powered. The powering on of device 236 may precede the powering on of the associated information handling system 102. In step 325, the associated information handling system 102 may be powered on to virtual standby power.

In step 330, the power requirements needed for the operation of information handling system 102 may be determined by information handling system 102 using, for example, BIOS 246 and RAC 244. Information handling system 102 may report the necessary power requirements for the operation of information handling system 102. In one embodiment, the requirements may include the power requirements of any devices 236 to be used by information handling system 102. In a further embodiment, information handling system 102 may determine the power requirements of any devices 236 to be used by, for example, determining a slot power limit for the slot 234, querying device 236, or determining a default value for slot 234.

In step 340, it may be determined whether sufficient power is available to operate the information handling system 102, taking into account the power requirements of information handling system 102 in conjunction with any devices 236 to be used by information handling system 102. If the devices 236 to be used are shared by other information handling systems 102, such duplicative use may be taken into consideration in evaluating the power requirements by, for example, subtracting duplicate power requirements for shared devices 236 from power requirements received from information handling system 102. Step 340 may be implemented fully or in part by method 600 in conjunction with FIG. 6.

If sufficient power exists, method 300 may proceed to step 345. If sufficient power does not exist, method 300 may proceed to step 350.

In step 345, it may have been determined that insufficient power exists for the requested operation, and appropriate corrective action may be taken. For example, additional power units may be activated, or less crucial components powered down. In one embodiment, the operation of information handling system 102 may be denied or postponed. Method 300 may return to step 340 after such corrective action has been taken to reevaluate whether sufficient power exists to conduct the requested operation of the associated information handling system 102. In one embodiment, the request may be denied and method 300 may return to step 310 and information handling system 102 powered down.

In step 350, it may have been determined that sufficient power exists for the requested operation, and use of information handling system 102 may be allowed. Such use may include, for example, providing main power to device 236 for full operation thereof in step 350. In one embodiment, powering on information handling system 102 with main power in step 355 subsequent to powering on device 236 in step 350. Method 300 may return to step 310.

Figure 4:
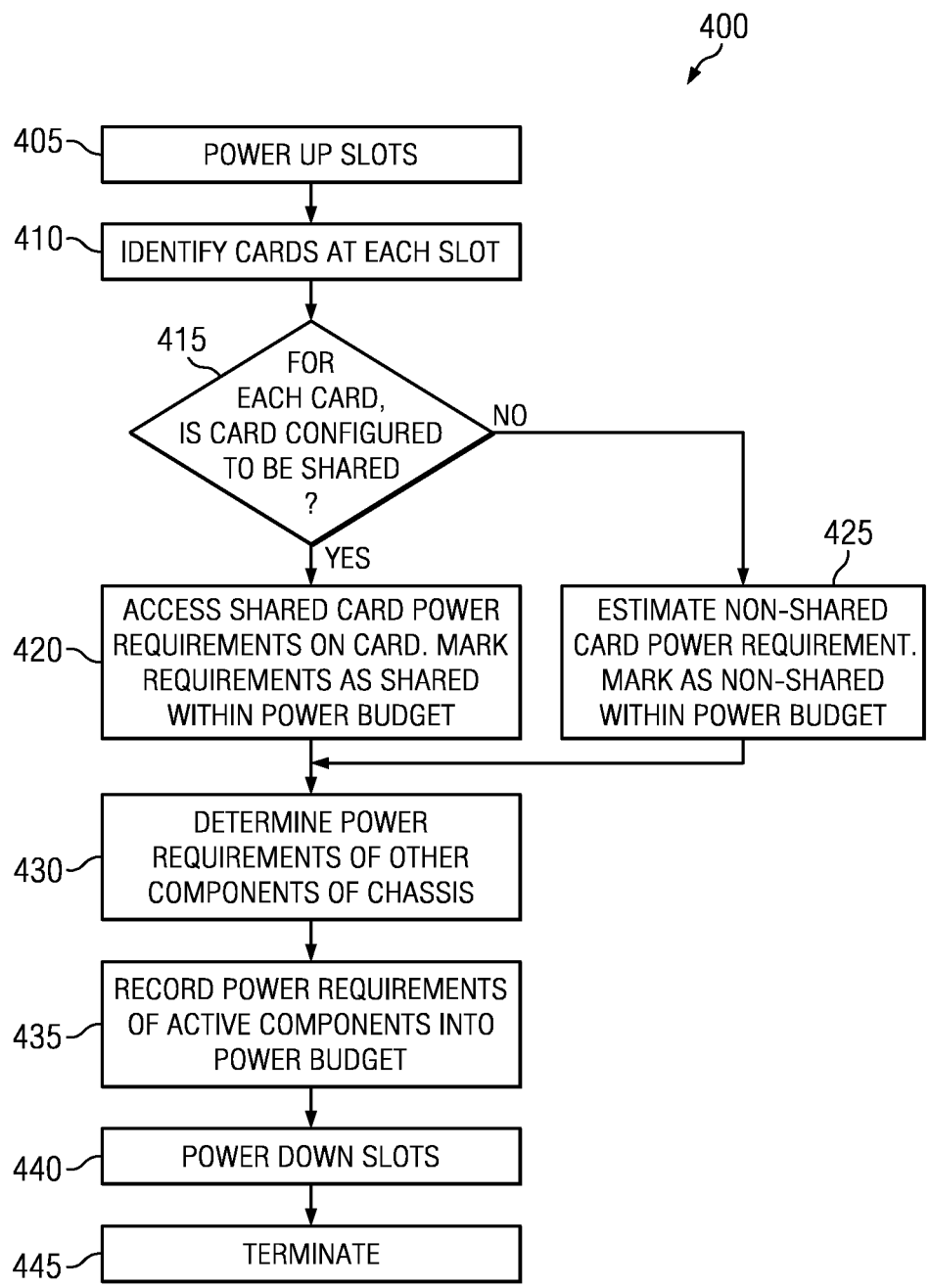
FIG. 4 illustrates a flow chart of an example method for initialization of power management for PCIe switches and devices in a multi-root input-output virtualization blade chassis.

FIG. 4 illustrates a flow chart of an example method 400 for initialization of power management for PCIe switches and devices in a multi-root input-output virtualization blade chassis. According to certain embodiments, method 400 may begin at step 405. As noted above, teachings of the present disclosure may be implemented in a variety of configurations of system 100 as shown in FIGS. 1 and 2. As such, the preferred initialization point for method 400 and the order of the steps comprising method 400 may depend on the implementation chosen. Method 400 may implement fully or in part step 305 of method 300.

Method 400 may begin in response to any suitable stimulus or trigger. For example, method 400 may be invoked in response to powering on of chassis 101. In another example, method 400 may be invoked after a failover or reboot of chassis management controller 11. In yet another example, method 400 may be invoked upon the determination that a device 236 has been newly inserted into or newly removed from a slot 234. In these and other embodiments, method 400 may be implemented as firmware, software, applications, functions, libraries, or other instructions continually monitoring chassis 101 for such powering on. In a further embodiment, method 400 may be implemented fully or partially by such instructions within chassis management controller 112.

In step 405, slots 234 may be powered on. Slots 234 may be enumerated to determine whether any devices 236 are attached thereto. In step 410, devices 236 present in a given slot 234 may be identified. The manner in which device 236 is identified may depend whether device 236 is configured to be able to be shared in chassis 101. In step 415, it may be determined whether device 236 is to configured to be able to be shared or not. If not, method 400 may proceed to step 425.

If so, in step 420 identifying information may be accessed on device 236. Such information may be resident within EEPROM 238. The information may include management information enabling the sharing of device 236. Power requirements needed for the operation of device 236 may be determined. These power requirements may be denoted in a power budget for chassis 101. Furthermore, these power requirements may be marked as shared. Method 400 may proceed to step 425.

In step 425, power requirements for non-shared device 236 may be estimated. Such power requirement estimations may be based on, for example, a default power requirement based on the nature of slot 234. The estimation performed in step 425 may later be updated with power requirements determined by an information handling system 102 which has been mapped to device 236. The power requirements for non-shared device 236 may be marked as non-shared within a power budget for chassis 101.

In step 430, the power requirements of other components of chassis 101 may be determined and recorded. In step 435, the power requirements of the components of the chassis which are actually active may be denoted in the power budget.

In step 440, the slots 234 and associated devices 236 may be powered down. In step 445, method 400 may terminate.

Figure 5:
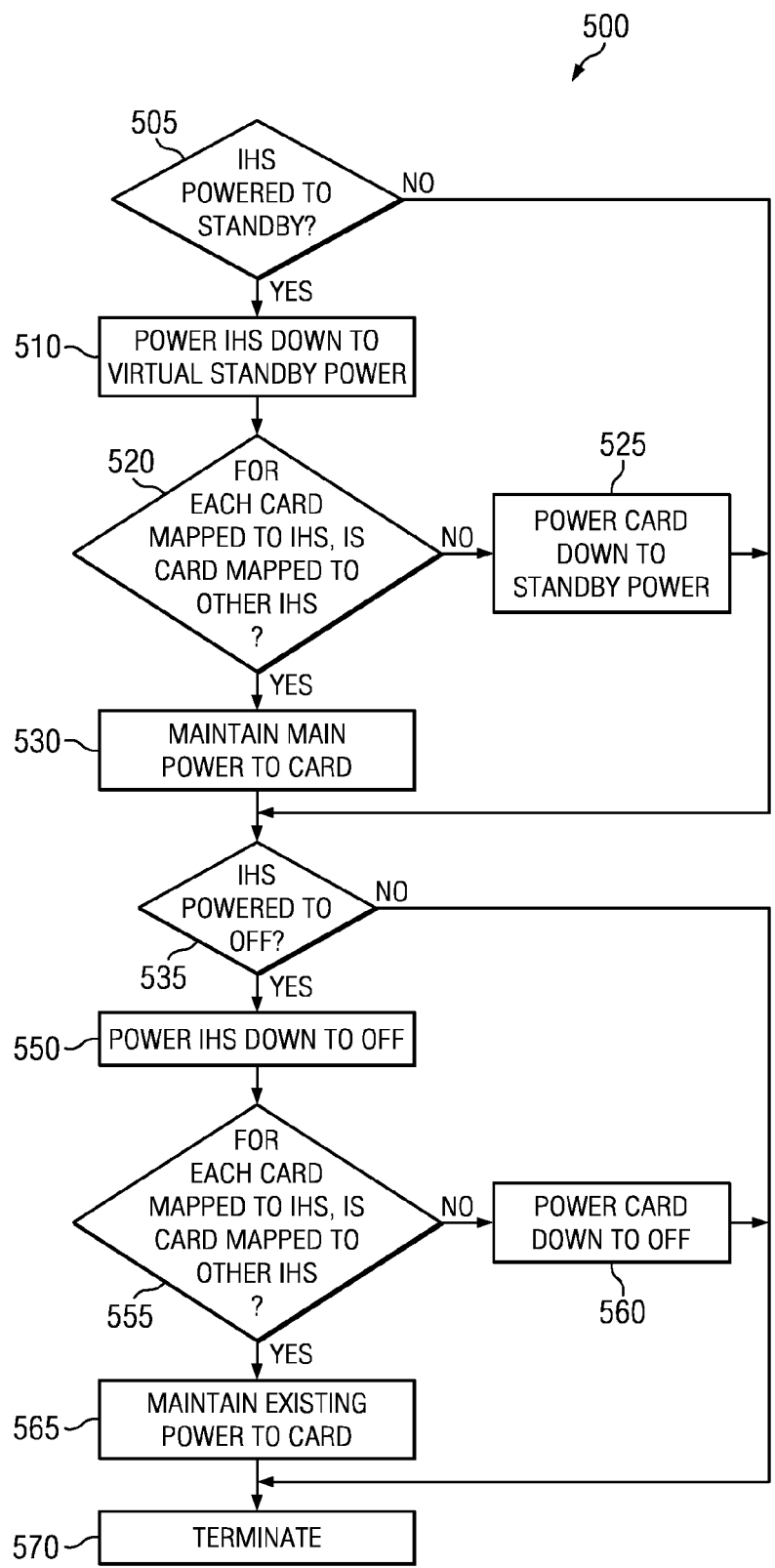
FIG. 5 illustrates a flow chart of an example method for checking for and conducting power-down operations as part of power management for PCIe switches and devices in a multi-root input-output virtualization blade chassis.

FIG. 5 illustrates a flow chart of an example method 400 for checking for and conducting power-down operations as part of power management for PCIe switches and devices in a multi-root input-output virtualization blade chassis. According to certain embodiments, method 500 may begin at step 505. As noted above, teachings of the present disclosure may be implemented in a variety of configurations of system 100 as shown in FIGS. 1 and 2. As such, the preferred initialization point for method 500 and the order of the steps comprising method 500 may depend on the implementation chosen. Method 500 may implement fully or in part step 325 of method 300.

Method 500 may begin in response to any suitable stimulus or trigger. For example, method 500 may be invoked in response to an attempted powering down of an information handling system 505, or at any suitable time during method 300 to check for such a powering down. In these and other embodiments, method 500 may be implemented as firmware, software, applications, functions, libraries, or other instructions continually monitoring chassis 101 for such powering on. In a further embodiment, method 500 may be implemented fully or partially by such instructions within chassis management controller 112.

In step 505, it may be determined whether any given information handling system 102 is to be powered down to standby power. Such a power-down operation may be caused by, for example, the lack of present need for the computing capabilities of the given information handling system 102. If no information handling system 102 is to be powered down to standby power, then method 500 may proceed to step 535. If any information handling system 102 is to be powered down to standby power, then steps 510-530 may be repeated for each such information handling system 102.

In step 510, the given information handling system 102 may be powered down to virtual standby power. In step 520, it may be determined whether any of devices 236 are mapped to the given information handling system 102. For each such mapped device 236, it may be determined whether the device 236 is presently mapped to any other information handling system 102. If any such device 236—mapped to the given information handling system 102—is mapped to any other information handling system 102, then in step 530 main power may be maintained to the device 236. If, for any such device 236, no mapping exist to any other information handling system 102, then in step 525 the device may be powered down to standby power. Method 500 may proceed to step 535 for such devices. Thus, powering down of devices 236 may be conducted subsequent to powering down of associated information handling systems 102.

In step 535, it may be determined whether any given information handling system 102 is to be powered down to off. Such a power-down operation may be caused by, for example, removal of the given information handling system 102 from chassis 101. If no information handling system 102 is to be powered down to off, then method 500 may proceed to step 570. If any information handling system 102 is to be powered down to off, then steps 550-565 may be repeated for each such information handling system 102.

In step 550, the given information handling system 102 may be powered down to off. In step S555, it may be determined whether any of devices 236 are mapped to the given information handling system 102. For each such mapped device 236, it may be determined whether the device 236 is presently mapped to any other information handling system 102. If any such device 236—mapped to the given information handling system 102—is mapped to any other information handling system 102, then in step 565 existing power may be maintained to the device 236. If, for any such device 236, no mapping exist to any other information handling system 102, then in step 560 the device may be powered down to off. Method 500 may proceed to step 570 for such devices. Thus, powering down of devices 236 may be conducted subsequent to powering down of associated information handling systems 102.

In step 570, method 500 may terminate.

Figure 6:
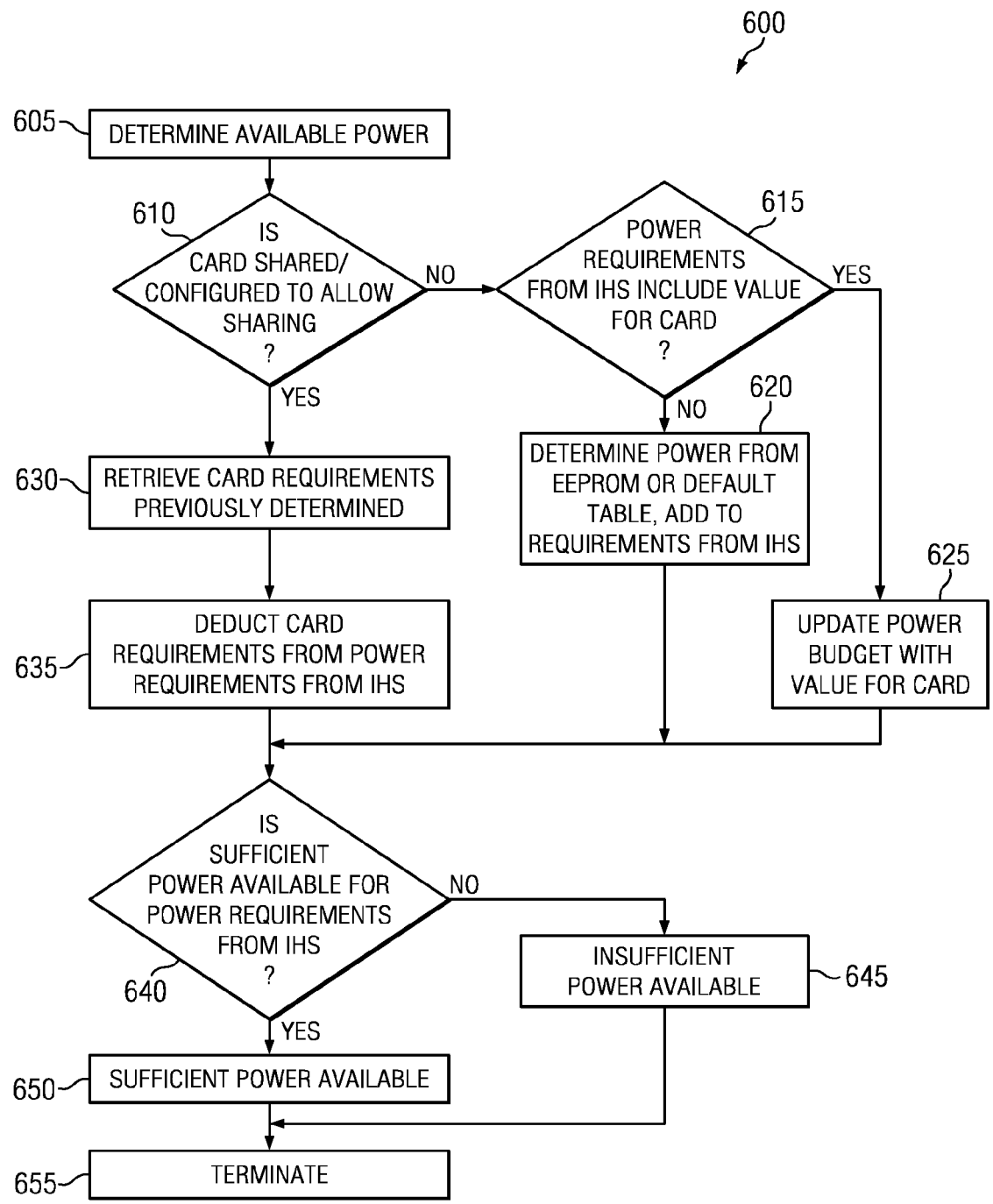
FIG. 6 illustrates a flow chart of an example method for determining whether sufficient power exists for a request from an information handling system to operate as part of power management for PCIe switches and devices in a multi-root input-output virtualization blade chassis.

FIG. 6 illustrates a flow chart of an example method 600 for determining whether sufficient power exists for a request from an information handling system to operate as part of power management for PCIe switches and devices in a multi-root input-output virtualization blade chassis. According to certain embodiments, method 600 may begin at step 605. As noted above, teachings of the present disclosure may be implemented in a variety of configurations of system 100 as shown in FIGS. 1 and 2. As such, the preferred initialization point for method 6500 and the order of the steps comprising method 600 may depend on the implementation chosen. Method 600 may implement fully or in part step 340 of method 300.

Method 600 may begin in response to any suitable stimulus or trigger. For example, method 600 may be invoked in response to receiving a request for powering on an information handling system. In these and other embodiments, method 600 may be implemented as firmware, software, applications, functions, libraries, or other instructions continually monitoring chassis 101 for such powering on. In a further embodiment, method 500 may be implemented fully or partially by such instructions within chassis management controller 112.

In step 605, available power in chassis 101 may be determined. In step 610, it may be determined, for each device 236 to be mapped to an information handling system 102 which generated a power request, whether the device 236 is shared or is configured to allow sharing through IOV. Steps 610-650 may be repeated for each such device. If a given device is so shared or configured for allowing sharing, then method 610 may proceed to step 630. If not, then method 615 may proceed to step 615.

In step 615, it may be determined whether the power requirements received from the information handling system 102 include any budgeted values for the operation of the given device 236. The included values may have been determined by, for example, BIOS 246 querying device 236 through RAC 244, determining power slot limits, or determining a default value. If not, then method 600 may proceed to step 620, wherein power requirements of the associated device 236 may be determined by accessing EEPROM 238 or looking up default values in a default, and subsequently adding the power requirements of the device 236 to the overall power request from information handling system 102. Method 600 may proceed to step 640.

If the power requirements received from the information handling system 102 do include any budgeted values for the operation of the given device 236, then in step 625 the budgeted value within the overall budget for chassis 101 may be recorded.

In step 630, wherein the given device 236 may be shared or otherwise configured to allow sharing, the power requirements for device 236 may be retrieved. The power requirements may have been previously determined, such as illustrated in method 400. In step 635, the power requirements for the given device 236 may be deducted from the power requirements reported by information handling system 102. Method 600 may then proceed to step 640.

In step 640, it may be determined whether sufficient power is available within chassis 101 to service the request received from information handling system 102. If not, then in step 645 it may be determined that insufficient power is available. If so, then in step 650 it may be determined that sufficient power is available. In step 655, method 600 may terminate.

Although FIGS. 3-6 discloses a particular number of steps to be taken with respect to methods 300, 400, 500, and 600, methods 300, 400, 500, and 600 may be executed with greater or lesser steps than those depicted in FIGS. 3-6. In addition, although FIGS. 3-6 discloses a certain order of steps to be taken with respect to methods 300, 400, 500, and 600, the steps comprising methods 300, 400, 500, and 600 may be completed in any suitable order.

Methods 300, 400, 500, and 600 may be implemented using system 100, components thereof or any other system such as those shown in FIGS. 1-2 operable to implement methods 300, 400, 500, and 600. In certain embodiments, methods 300, 400, 500, and 600 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A system comprising:
a chassis management controller configured to, upon initialization of a first modular information handling system of two or more modular information handling systems sharing a shared information handling resource:
   determine power requirements of the shared information handling resource;
   receive power requirements from the first modular information handling system;
   determine whether the power requirements from the first modular information handling system includes power requirements of the shared information handling resource;
   responsive to a determination that the power requirements from the first modular information handling system include power requirements of the shared information handling resource, subtract the power requirements of the shared information handling resource from the power requirements of the first modular information handling system to determine resultant power requirements;
   compare the resultant power requirements with available power; and
   responsive to the resultant power requirements being less than the available power, allow operation of the first modular information handling system.

2. The system of claim 1 further comprising one or more switches configured to virtualize access of the shared information handling resource to the two or more modular information handling systems.

3. The system of claim 1, wherein the chassis management controller is further configured to power on the shared information handling resource before powering on the first modular information handling system.

4. The system of claim 1, wherein the chassis management controller is further configured to:
   power down the first modular information handling system; and
   simultaneously, maintain the power provided to the shared information handling resource as long as the shared information handling resource is mapped to at least one modular information handling system.

5. The system of claim 1, wherein the chassis management controller is further configured to, upon initialization of a chassis housing the two or more modular information handling systems:
   power on each information handling resource housed in the chassis;
   enumerate the information handling resources housed in the chassis;
   determine the power requirements of each information handling resource; and
   incorporate the power requirements of the information handling resources into a power budget, the power budget including power requirements of the chassis, and wherein comparing the resultant power requirements with available power includes comparing the resultant power requirements with available power as set forth in the power budget.

6. The system of claim 1, wherein the chassis management controller is further configured to:
   further determine whether the power requirements from the first modular information handling system include power requirements of a non-shared information handling resource;

based on the determination that the power requirements from the first modular information handling system include power requirements of a non-shared information handling resource, determine whether the non-shared information handling resource is configured to be capable of being shared; and responsive to a determination that the non-shared information handling resource is configured to be capable of being shared, subtract the power requirements of the non-shared information handling resource configured to be capable of being shared from the power requirements of the first modular information handling system to determine resultant power requirements.

7. The system of claim 1, wherein the chassis management controller is further configured to:

further determine whether the power requirements from the first modular information handling system include power requirements of a non-shared information handling resource;

based on the determination that the power requirements from the first modular information handling system include power requirements of a non-shared information handling resource, determine whether the non-shared information handling resource is configured to be capable of being shared; and responsive to a determination that the non-shared information handling resource is not configured to be capable of being shared, accept the power requirements of the first modular information handling system to determine resultant power requirements.

8. A method comprising:

upon initialization of a first modular information handling system two or more modular information handling systems sharing a shared information handling resource:

determining power requirements of the shared information handling resource;

receiving power requirements from the first modular information handling system;

determining whether the power requirements from the first modular information handling system includes power requirements of the shared information handling resource;

responsive to a determination that the power requirements from the first modular information handling system includes power requirements of the shared information handling resource, subtracting the power requirements of the shared information handling resource from the power requirements of the first modular information handling system to determine resultant power requirements;

comparing the resultant power requirements with available power; and responsive to the resultant power requirements being less than the available power, allowing operation of the first modular information handling system.

9. The method of claim 8, further comprising using one or more switches to virtualizing access of the shared information handling resource to the two or more modular information handling systems.

10. The method of claim 8, further comprising powering on the shared information handling resource before powering on the first modular information handling system.

11. The method of claim 8, further comprising:

powering down the first modular information handling system; and simultaneously, maintaining the power provided to the shared information handling resource as long as the shared information handling resource is mapped to at least one modular information handling system.

12. The method of claim 8, further comprising, upon initialization of a chassis housing the two or more modular information handling systems:

powering on each information handling resource housed in the chassis;

enumerating the information handling resources housed in the chassis;

determining the power requirements of each information handling resource; and incorporating the power requirements of the information handling resources into a power budget, the power budget including power requirements of the chassis, and wherein comparing the resultant power requirements with available power includes comparing the resultant power requirements with available power as set forth in the power budget.

13. The method of claim 8, further comprising:

further determining whether the power requirements from the first modular information handling system include power requirements of a non-shared information handling resource;

based on the determination that the power requirements from the first modular information handling system include power requirements of a non-shared information handling resource, determining whether the non-shared information handling resource is configured to be capable of being shared; and responsive to a determination that the non-shared information handling resource is configured to be capable of being shared, subtracting the power requirements of the non-shared information handling resource configured to be capable of being shared from the power requirements of the first modular information handling system to determine resultant power requirements.

14. The method of claim 8, further comprising:

further determining whether the power requirements from the first modular information handling system include power requirements of a non-shared information handling resource;

based on the determination that the power requirements from the first modular information handling system include power requirements of a non-shared information handling resource, determining whether the non-shared information handling resource is configured to be capable of being shared; and responsive to a determination that the non-shared information handling resource is not configured to be capable of being shared, accepting the power requirements of the first modular information handling system to determine resultant power requirements.

15. An article of manufacture comprising:

a non-transitory computer readable medium; and computer-executable instructions carried on the computer readable medium, the instructions readable by a processor, the instructions, when read and executed, for causing the processor to:

upon initialization of a first modular information handling system of two or more modular information handling systems sharing the shared information handling resource:

determine power requirements of the shared information handling resource;

receive power requirements from the first modular information handling system;

determine whether the power requirements from the first modular information handling system include power requirements of the shared information handling resource;

responsive to a determination that the power requirements from the first modular information handling system includes power requirements of the shared information handling resource, subtract the power requirements of the shared information handling resource from the power requirements of the first modular information handling system to determine resultant power requirements;

compare the resultant power requirements with available power; and responsive to the resultant power requirements being less than the available power, allow operation of the first modular information handling system.

16. The article of claim 15, the instructions for further causing the processor to, using one or more switches, virtualize access of the shared information handling resource to the two or more modular information handling systems.

17. The article of claim 15, the instructions for further causing the processor to power on the shared information handling resource before powering on the first modular information handling system.

18. The article of claim 15, the instructions for further causing the processor to:

power down the first modular information handling system; and simultaneously, maintain the power provided to the shared information handling resource as long as the shared information handling resource is mapped to at least one modular information handling system.

19. The article of claim 15, the instructions for further causing the processor to, upon initialization of a chassis housing the two or more modular information handling systems:

power on each information handling resource housed in the chassis;

enumerate the information handling resources housed in the chassis;

determine the power requirements of each information handling resource; and incorporate the power requirements of the information handling resources into a power budget, the power budget including power requirements of the chassis, and wherein comparing the resultant power requirements with available power includes comparing the resultant power requirements with available power as set forth in the power budget.

20. The article of claim 15, the instructions for further causing the processor to:

further determine whether the power requirements from the first modular information handling system include power requirements of a non-shared information handling resource;

based on the determination that the power requirements from the first modular information handling system include power requirements of a non-shared information handling resource, determine whether the non-shared information handling resource is configured to be capable of being shared; and responsive to a determination that the non-shared information handling resource is configured to be capable of being shared, subtract the power requirements of the non-shared information handling resource configured to be capable of being shared from the power requirements of the first modular information handling system to determine resultant power requirements.

21. The article of claim 15, the instructions for further causing the processor to:

further determine whether the power requirements from the first modular information handling system include power requirements of a non-shared information handling resource;

based on the determination that the power requirements from the first modular information handling system include power requirements of a non-shared information handling resource, determine whether the non-shared information handling resource is configured to be capable of being shared; and responsive to a determination that the non-shared information handling resource is not configured to be capable of being shared, accept the power requirements of the first modular information handling system to determine resultant power requirements.

* * * * *